(12) United States Patent
Nagata et al.

(10) Patent No.: US 9,979,454 B2
(45) Date of Patent: May 22, 2018

(54) RADIO COMMUNICATION SYSTEM AND METHOD FOR FEEDING BACK A PLURALITY OF PIECES OF CHANNEL STATE INFORMATION UNDER COORDINATED MULTI-POINT TRANSMISSION

(71) Applicant: NTT DOCOMO, INC., Tokyo (JP)

(72) Inventors: Satoshi Nagata, Tokyo (JP); Xiang Yun, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 409 days.

(21) Appl. No.: 14/404,084

(22) PCT Filed: Apr. 26, 2013

(86) PCT No.: PCT/JP2013/062360
§ 371 (c)(1),
(2) Date: Nov. 26, 2014

(87) PCT Pub. No.: WO2013/179833
PCT Pub. Date: Dec. 5, 2013

(65) Prior Publication Data
US 2015/0103774 A1    Apr. 16, 2015

(30) Foreign Application Priority Data
May 31, 2012   (JP) .................................. 2012-124571

(51) Int. Cl.
*H04B 7/06* (2006.01)
*H04W 72/04* (2009.01)
*H04B 7/024* (2017.01)

(52) U.S. Cl.
CPC ........... *H04B 7/0626* (2013.01); *H04B 7/024* (2013.01); *H04W 72/042* (2013.01)

(58) Field of Classification Search
CPC .... H04B 7/0626; H04B 7/024; H04W 72/042
See application file for complete search history.

(56) References Cited

U.S. PATENT DOCUMENTS

| 2010/0238821 A1* | 9/2010 | Liu | H04L 43/045 370/252 |
| 2012/0281556 A1* | 11/2012 | Sayana | H04B 7/024 370/252 |

(Continued)

OTHER PUBLICATIONS

International Search Report for corresponding International Application No. PCT/JP2013/062360, dated Jul. 30, 2013 (2 pages).

(Continued)

*Primary Examiner* — Chi H Pham
*Assistant Examiner* — Weibin Huang
(74) *Attorney, Agent, or Firm* — Osha Liang LLP

(57) ABSTRACT

The present invention is designed to feed back a plurality of pieces of CSI with respect to each transmission point, when CoMP transmission is applied in the framework of carrier aggregation. The radio communication method according to the present invention is a radio communication method in a radio communication system including a plurality of radio base station apparatuses and a user terminal that is configured to be able to perform coordinated multi-point transmission/reception with the plurality of radio base station apparatuses, and, in this radio communication method, when coordinated multi-point transmission is applied, the radio base station apparatus, transmits CSI set information on a set including at least one CSI through higher layer signaling, and also transmits CSI request information in DCI, and the user terminal feeds back CSI based on the CSI set information and the CSI request information.

6 Claims, 19 Drawing Sheets

| VALUE OF CSI REQUEST FIELD | DESCRIPTION |
|---|---|
| '00' | NO CSI REPORT IS TRIGGERED |
| '01' | [CSI IS REPORTED FOR SERVING CELL] |
| '10' | CSI IS REPORTED FOR A 1ST SET OF SERVING CELLS CONFIGURED BY HIGHER LAYERS |
| '11' | CSI IS REPORTED FOR A 2ND SET OF SERVING CELLS CONFIGURED BY HIGHER LAYERS |

(56) References Cited

U.S. PATENT DOCUMENTS

2013/0107832 A1* 5/2013 Kim .................. H04B 7/024
370/329
2013/0301548 A1* 11/2013 Etemad ............. H04W 76/048
370/329

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).
3GPP TS 36.212 V9.3.0; "3rd Generation Partnership Project; Technical Specification Group Radio Access Network; Evolved Universal Terrestrial Radio Access (E-UTRA); Multiplexing and channel coding (Release 9);" Sep. 2010 (61 pages).
Samsung; "Miscellaneous Corrections;" 3GPP TSG-RAN WG1 #65, R1-111446; Barcelona, Spain; May 9-13, 2011 (77 pages).
Samsung; "CSI feedback modes for DL CoMP;" 3GPP TSG RAN WG1 #68bis, R1-121626; Jeju, Korea; Mar. 26-30, 2012 (3 page).
Office Action issued in corresponding Japanese Application No. 2012-124571, dated Jan. 13, 2015 (9 pages).
Extended European Search Report dated Jan. 19, 2016, in corresponding European Patent Application No. 13796434.2 (14 pages).
3GPP TSG-RAN WG1 #69 "Interference Measurements for CoMP CSI Reporting", R1-122840, Prague, Czech Republic, May 21-30, 2012 (4 pages).
3GPP TSG RAN WG1 meeting #68bis, "Details of CoMP measurement set", R1-120976, Jeju, Korea, Mar. 26-30, 2012 (4 pages).
3GPP TSG-RAN WG1 #69 "Signal quality metrics for measurement of CoMP resource management set", R1-122626, Prague, Czech, May 21-25, 2012 (3 pages).
Office Action issued in corresponding Chinese Application No. 201380028429.5, dated May 18, 2017 (17 pages).
Intel Corporation; "Signal quality metrics for measurement on CoMP resource management set"; 3GPP TSG-RAN WG1 #69, R1-122880; Prague, Czech; May 21-25, 2012 (4 pages).

* cited by examiner

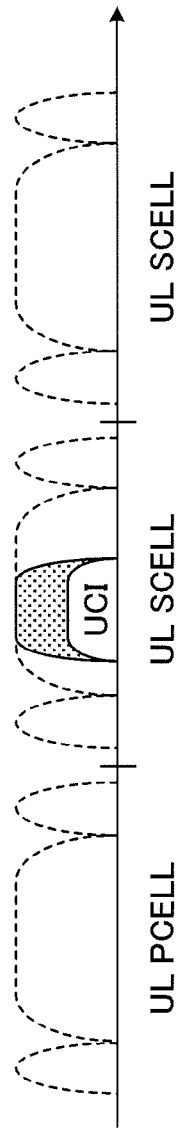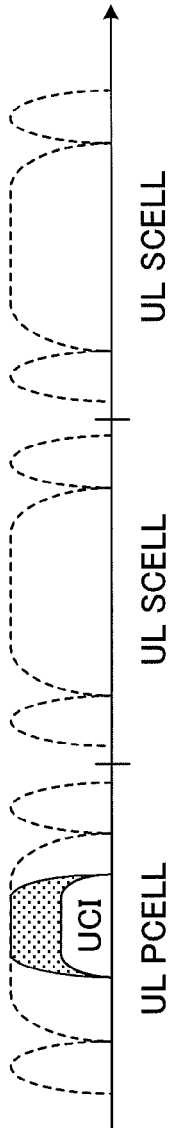
FIG.2A
FIG.2B

| VALUE OF CSI REQUEST FIELD | DESCRIPTION |
|---|---|
| '00' | NO CSI REPORT IS TRIGGERED |
| '01' | [CSI IS REPORTED FOR SERVING CELL] |
| '10' | CSI IS REPORTED FOR A 1ST SET OF SERVING CELLS CONFIGURED BY HIGHER LAYERS |
| '11' | CSI IS REPORTED FOR A 2ND SET OF SERVING CELLS CONFIGURED BY HIGHER LAYERS |

| VALUE OF CSI REQUEST FIELD | DESCRIPTION |
|---|---|
| '00' | NO CSI REPORT IS TRIGGERED |
| '01' | CSI IS REPORTED FOR SERVING CELL ASSUME INTERFERENCE OUT OF SERVING CELL |
| '10' | CSI IS REPORTED FOR A 1st SET OF CSI CONFIGURED BY HIGHER LAYERS |
| '11' | CSI IS REPORTED FOR A 2nd SET OF CSI CONFIGURED BY HIGHER LAYERS |

FIG.7A

| | TP 1(CSI-RS RESOURCE 1) | TP 2(CSI-RS RESOURCE 2) | |
|---|---|---|---|
| INTERFERENCE OUTSIDE ONE TP | CSI 1 (SMR1 + IMR1) | CSI 2 (SMR2 + IMR2) | 1st SET |
| INTERFERENCE OUTSIDE TWO TPs | CSI 3 (SMR1 + IMR3) | CSI 4 (SMR2 + IMR3) | 2nd SET |

FIG.7B

| VALUE OF CSI REQUEST FIELD | DESCRIPTION |
|---|---|
| '00' | NO CSI REPORT IS TRIGGERED |
| '01' | CSI IS REPORTED FOR SERVING CELL ASSUME INTERFERENCE OUT OF SERVING CELL |
| '10' | CSI IS REPORTED FOR INTERFERENCE OUT OF 1TP FOR ALL SERVING CELLS |
| '11' | CSI IS REPORTED FOR INTERFERENCE OUT OF 2TPS FOR ALL SERVING CELLS |

FIG.8

| VALUE OF CSI REQUEST FIELD | DESCRIPTION |
|---|---|
| '000' | NO CSI REPORT IS TRIGGERED |
| '001' | CSI IS REPORTED FOR SERVING CELL ASSUME INTERFERENCE OUT OF SERVING CELL |
| '010' | CSI IS REPORTED FOR INTERFERENCE OUT OF 1TP FOR 1st SET OF SERVING CELLS |
| '011' | CSI IS REPORTED FOR INTERFERENCE OUT OF 1TP FOR 2nd SET OF SERVING CELLS |
| '100' | CSI IS REPORTED FOR INTERFERENCE OUT OF 2TPS FOR 1st SET OF SERVING CELLS |
| '101' | CSI IS REPORTED FOR INTERFERENCE OUT OF 2TPS FOR 2nd SET OF SERVING CELLS |

FIG.9

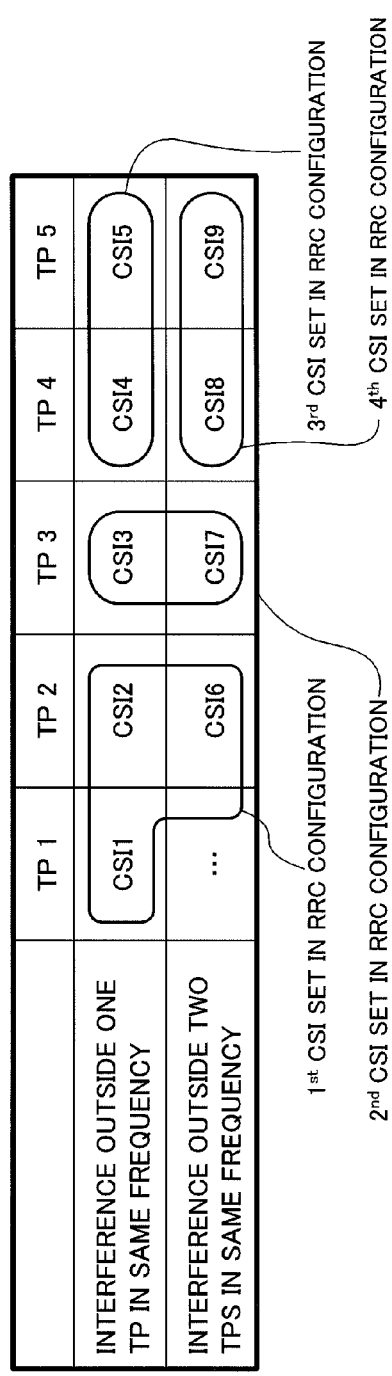

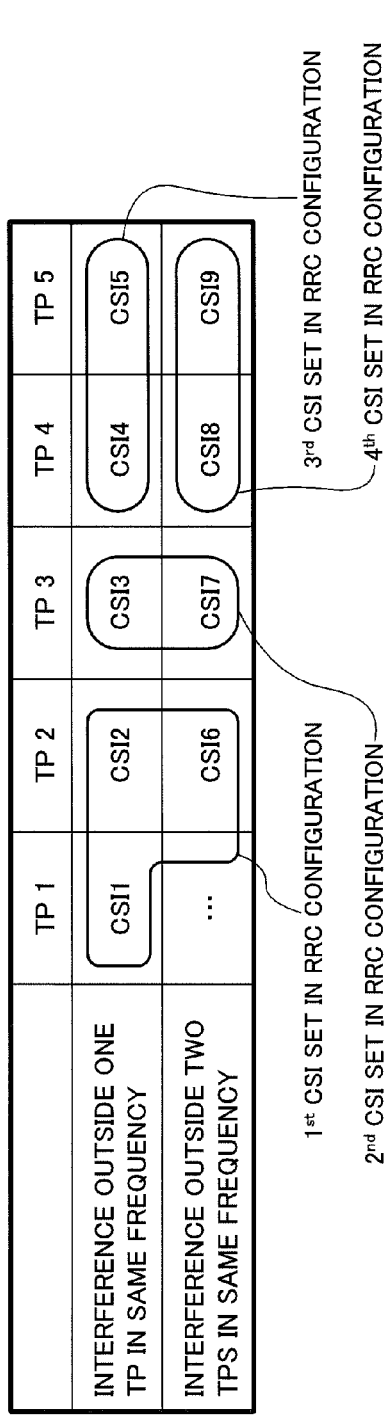

FIG.14A

| VALES OF CIF | VALUE OF CSI REQUEST FIELD | DESCRIPTION |
|---|---|---|
| '000' | '00' | NO CSI REPORT IS TRIGGERED |
| '000' | '01' | CSI IS REPORTED FOR SERVING CELL ASSUME INTERFERENCE OUT OF SERVING CELL |
| '000' | '10' | CSI IS REPORTED FOR A 1st SET OF CSI CONFIGURED BY HIGHER LAYERS |
| '000' | '11' | CSI IS REPORTED FOR A 2nd SET OF CSI CONFIGURED BY HIGHER LAYERS |
| '001' | '10' | CSI IS REPORTED FOR A 3rd SET OF CSI CONFIGURED BY HIGHER LAYERS |
| '001' | '11' | CSI IS REPORTED FOR A 4th SET OF CSI CONFIGURED BY HIGHER LAYERS |

FIG.14B

RADIO COMMUNICATION SYSTEM AND METHOD FOR FEEDING BACK A PLURALITY OF PIECES OF CHANNEL STATE INFORMATION UNDER COORDINATED MULTI-POINT TRANSMISSION

TECHNICAL FIELD

The present invention relates to a radio communication system, a radio base station apparatus and a radio communication method in a next-generation radio communication system.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used on the downlink, and a scheme that is based on SC-FDMA (Single Carrier Frequency Division Multiple Access) is used on the uplink.

In the LTE system, uplink signals are mapped to adequate radio resources and transmitted from a user terminal to a radio base station apparatus. To be more specific, uplink user data is transmitted using an uplink shared channel (PUSCH: Physical Uplink Shared Channel). Also, uplink control information (UCI) is transmitted by using the PUSCH when transmitted with uplink user data or by using an uplink control channel (PUCCH: Physical Uplink Control Channel) when transmitted alone.

Uplink control information (UCI) includes delivery acknowledgment (ACK/NACK) for a downlink shared channel (PDSCH: Physical Downlink Shared Channel), a scheduling request, channel state information (CSI), and so on (see, for example, non-patent literature 2). Channel state information (hereinafter referred to as "CSI") is information that is based on the dynamic channel state on the downlink, and may be, for example, channel quality information (CQIs), precoding matrix indicators (PMIs), rank indicators (RIs) and so on. This CSI is reported from a user terminal to a radio base station apparatus periodically or aperiodically.

In response to a trigger from a radio base station apparatus, aperiodic channel state information (aperiodic CSI) is reported from a user terminal to that radio base station. This trigger (aperiodic CSI triggering) is included in an uplink scheduling grant (hereinafter referred to as "UL (Uplink) grant") (DCI format 0/4) that is transmitted in a downlink control channel (PDCCH: Physical Downlink Control Channel). Following the trigger included in this UL grant, the user terminal reports aperiodic channel state information (hereinafter referred to as "A-CSI") using the PUSCH indicated by this UL grant. This reporting of A-CSI is also referred to as "aperiodic channel state information reporting (aperiodic CSI (CQI/PMI/RI) reporting)."

CITATION LIST

Non-Patent Literature

Non-Patent Literature 1: 3GPP, TR 25.912 (V7.1.0), "Feasibility Study for Evolved UTRA and UTRAN," September 2006

Non-Patent Literature 2: 3GPP, TS 36.212 (V.9.3.0), "Multiplexing and Channel Coding," November 2010

SUMMARY OF INVENTION

Technical Problem

Now, in the 3GPP, successor systems of LTE are also under study for the purpose of achieving further broadbandization and higher speed (for example, LTE-Advanced (LTE-A) system). In the LTE-A system, it is preferable to achieve broadbandization while maintaining backward compatibility with the LTE system. So, in the LTE-A system, study is in progress to use fundamental frequency blocks (component carriers (CCs)) having a band that can be used in the LTE system (for example, 20 MHz), and achieve broadbandization by aggregating a plurality of component carriers (providing, for example, 100 MHz when five CCs are aggregated).

In this LTE-A system, at least one cell is provided for one component carrier (CC), and a user terminal is configured to be able to communicate in a plurality of cells of varying component carriers (CCs). Note that, with respect to each component carrier (CC), one cell in which a user terminal communicates primarily is also referred to as a "serving cell." In this way, in the LTE-A system, broadbandization of the system band is achieved by allowing a user terminal to conduct radio communication in a plurality of serving cells of varying component carriers.

In this LTE-A system, when a user terminal conducts radio communication in a plurality of serving cells of different component carriers (CCs), the conditions of communication such as represented by the level of interference vary per serving cell. Consequently, in the LTE-A system, it is necessary to feed back a plurality of pieces of CSI described above.

Meanwhile, as a promising technique for further improving the system performance of the LTE system, there is inter-cell orthogonalization. For example, in the LTE-A system, intra-cell orthogonalization is made possible by orthogonal multiple access on both the uplink and the downlink. That is to say, on the downlink, orthogonality is established between user terminal UEs (User Equipment) in the frequency domain. On the other hand, between cells, like in W-CDMA, interference randomization by one-cell frequency re-use is fundamental.

So, in the 3GPP (3rd Generation Partnership Project), coordinated multi-point transmission/reception (CoMP) techniques are under study as techniques to achieve inter-cell orthogonalization. In this CoMP transmission/reception, a plurality of cells coordinate and perform signal processing for transmission and reception for one user terminal UE or for a plurality of user terminal UEs. For example, for the downlink, simultaneous transmission of a plurality of cells adopting precoding, and coordinated scheduling/beam forming, are under study. By adopting these CoMP transmission/reception techniques, improvement of throughput performance is expected, especially with respect to user terminal UEs located on cell edges.

In this way, in the LTE-A system, a scenario to conduct CoMP transmission in a carrier aggregation environment may be possible. In this scenario, a user terminal has to feed back a plurality of pieces of CSI with respect to a plurality of transmission points of varying interference levels. However, the present framework of carrier aggregation is designed to feed back one piece of CSI to each cell, and, when CoMP transmission is applied, provides no support for feeding back a plurality of pieces of CSI with respect to each transmission point.

The present invention has been made in view of the above, and it is therefore an object of the present invention to provide a radio communication system, a radio base station apparatus and a radio communication method, whereby, when CoMP transmission is applied to the framework of carrier aggregation, it is possible to feed back a plurality of pieces of CSI with respect to each transmission point.

Solution to Problem

A radio communication system of the present invention is a radio communication system including a plurality of radio base station apparatuses and a user terminal that is configured to be able to perform coordinated multi-point transmission/reception with the plurality of radio base station apparatuses, the radio communication system comprising: the radio base station apparatus that, when coordinated multi-point transmission is applied, transmits CSI (Channel State Information) set information on a set including at least one channel state information through higher layer signaling, and also transmits CSI request information in downlink control information; and the user terminal that feeds back the channel state information based on the CSI set information and the CSI request information.

A radio communication system of the present invention is a radio communication system including a plurality of radio base station apparatuses and a user terminal that is configured to be able to perform coordinated multi-point transmission/reception with the plurality of radio base station apparatuses, the radio communication system comprising: the radio base station apparatus that, when coordinated multi-point transmission is applied, transmits information as to which interference is an interference component, as CSI request information in downlink control information; and the user terminal that feeds back channel state information based on the CSI request information.

A radio communication system of the present invention is a radio communication system including a plurality of radio base station apparatuses and a user terminal that is configured to be able to perform coordinated multi-point transmission/reception with the plurality of radio base station apparatuses, the radio communication system comprising: the radio base station apparatus that, when coordinated multi-point transmission is applied, transmits TP (Transmission Point) set information on a set including at least one transmission point, through higher layer signaling, and also transmits CSI request information in downlink control information; and the user terminal that feeds back channel state information based on the TP set information and the CSI request information.

Advantageous Effects of Invention

According to the present invention, it is possible to feed back a plurality of pieces of CSI with respect to each transmission point when CoMP transmission is applied to the framework of carrier aggregation.

BRIEF DESCRIPTION OF DRAWINGS

FIG. 2 provides diagrams each showing an example of an uplink control information transmission method in an LTE-A system;

FIG. 7 provides diagrams for explaining a first method according to the present invention;

FIG. 8 is a diagram for explaining a second method according to the present invention;

FIG. 9 is a diagram for explaining a third method according to the present invention;

FIG. 13 provides diagrams for explaining a case where the second method is implemented in the scenario shown in FIG. 11;

FIG. 14 provides diagrams for explaining a case where the third method is implemented in the scenario shown in FIG. 11;

DESCRIPTION OF EMBODIMENTS

Figure 1:
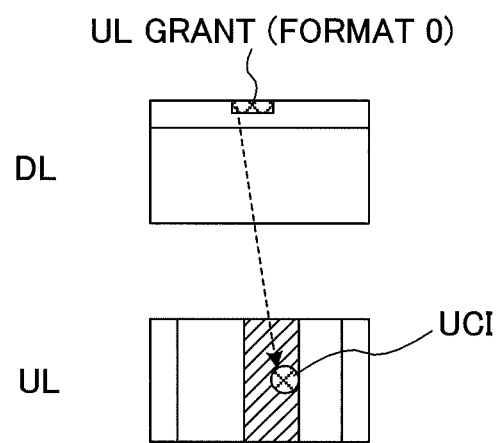
FIG. 1 is a diagram showing an example of an uplink control information transmission method in an LTE system.

Now, an embodiment of the present invention will be described below in detail with reference to the accompanying drawings. Note that, in the following description, a radio base station apparatus is interchangeable with a transmission point. FIG. 1 is a diagram showing an example of an uplink control information transmission method in an LTE system. As described above, uplink control information (UCI) is transmitted via an uplink control channel (PUCCH) when there is no uplink user data. On the other hand, when an uplink scheduling grant (UL grant) (DCI format 0/4) is transmitted via a downlink control channel (PDCCH) (that is, when there is uplink user data), uplink control information (UCI) is transmitted with the uplink user data via an uplink shared channel (PUSCH) that is designated by that UL grant.

For example, since a trigger of aperiodic channel state information reporting (hereinafter referred to as an "A-CSI trigger") is include in a UL grant (DCI format 0/4), aperiodic channel state information (A-CSI), which is one type of uplink control information (UCI), is transmitted via the PUSCH that is associated with that UL grant.

FIG. 2 provides diagram each showing an example of an uplink control information transmission method in an LTE-A system. In the LTE-A system, in order to achieve broadbandization by aggregating a plurality of component carriers (CCs), a user terminal is configured to be able to communicate in a plurality of serving cells of varying component carriers. On the other hand, in uplink transmission in the LTE-A system, the SC-FDMA radio access scheme is under study for application. Consequently, in uplink transmission, it is preferable to conduct transmission from a single CC (that is, from a single serving cell) to maintain the characteristics of uplink single-carrier transmission.

When conducting uplink transmission in a single CC, to transmit uplink control information (UCI), it is required to select the serving cell of a specific CC. For example, when UCI is transmitted via the PUCCH, the serving cell of the PCC (Primary Component Carrier) where the PUCCH is transmitted is selected. On the other hand, when UCI is transmitted with user data via the PUSCH, the serving cell of a CC that is associated with the UL grant is selected.

To be more specific, as shown in FIG. 2A, when A-CSI reporting from a user terminal is requested (when an A-CSI trigger is included in a UL grant), the serving cell of an SCC (Secondary Component Carrier) that is associated with that UL grant (also referred to as an "SCell") is selected, and UCI to include an A-CSI is transmitted using the SCC. On the other hand, as shown in FIG. 2B, when A-CSI reporting from a user terminal is not requested, the serving cell of a PCC (also referred to as a "PCell") is selected, and UCI is transmitted using the PCell selected. Also, in the LTE-A system, when there are a plurality of SCCs and A-CSI reporting from a user terminal is not requested, UCI is transmitted using an SCC of a small cell index.

Figure 3:
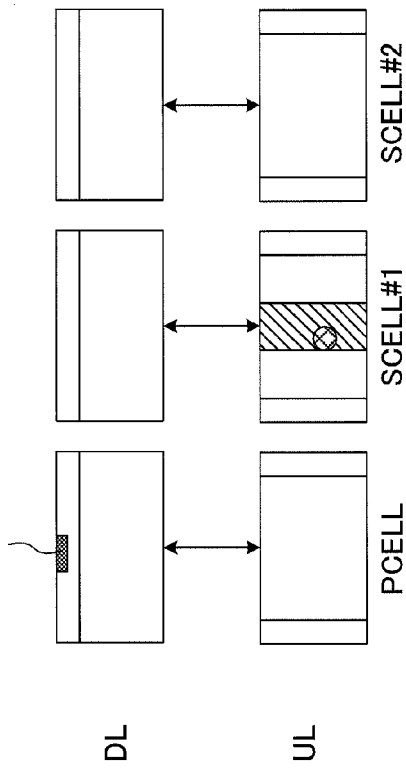
FIG. 3 is a diagram showing an example of an A-CSI reporting method in an LTE-A system.

FIG. 3 is a diagram to show an example of an A-CSI transmission method in the LTE-A system. As shown in FIG. 3, when an attempt to designate at least one downlink serving cell is made on the network side, it may be possible to add bit information to designate a predetermined serving cell, in addition to an A-CSI trigger, in a UL grant (DCI format 0/4). For example, as shown in FIG. 3, study is in progress to specify as to which downlink serving cell's A-CSI should be reported, in addition to whether or not A-CSI should be reported, by adding one bit to the conventional A-CSI trigger field (one bit).

For example, in FIG. 3, when the value of the two-bit A-CSI trigger field (also referred to as "CSI request field") is "00," this means that "A-CSI is not transmitted." Also, when the value of the A-CSI trigger field is "01," this means that "A-CSI of a downlink CC corresponding to an uplink CC that is associated with the UL grant is transmitted." Also, when the value of the A-CSI trigger field is "10," this means that "A-CSI with respect to at least one serving cell designated as a first set by higher layer signaling is transmitted." Also, when the value of the A-CSI trigger filed is "11," this means that "A-CSI with respect to at least one serving cell designated as a second set by higher layer signaling is transmitted."

In the above examples, by reporting in advance at least one downlink serving cell that constitutes the first set and the second set by means of higher control signals using higher layer signaling (for example, RRC signaling, MAC signaling, broadcast signals and so on), two kinds of reporting patterns are achieved when the value of the A-CSI trigger field is "10" and "11."

For example, assume that, when a user terminal uses two serving cells (cells #0 and #1), cell #0 is reported as the first set and cell #1 is reported as the second set by means of higher control signals. In this case, when the value of the A-CSI trigger field included in the UL grant (format 0/4) is "10," the user terminal reports the A-CSI of cell #0 of the first set to the radio base station apparatus. On the other hand, when the value of the A-CSI trigger field is "11," the user terminal reports the A-CSI of cell #1 of the second set.

Figure 4A:
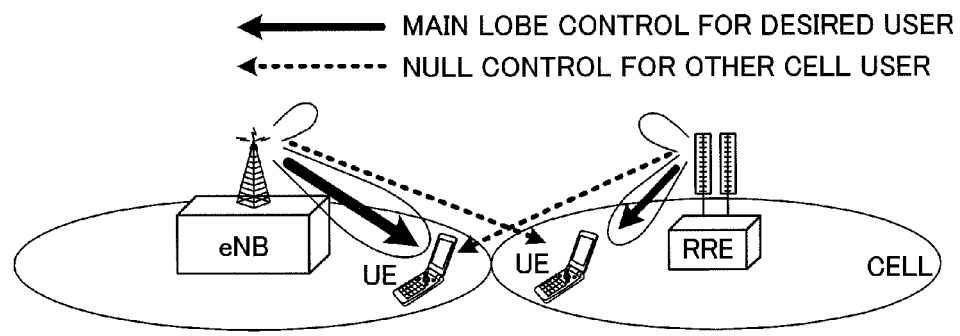
FIG. 4 provides diagrams for explaining coordinated multi-point transmission.
Figure 4B:
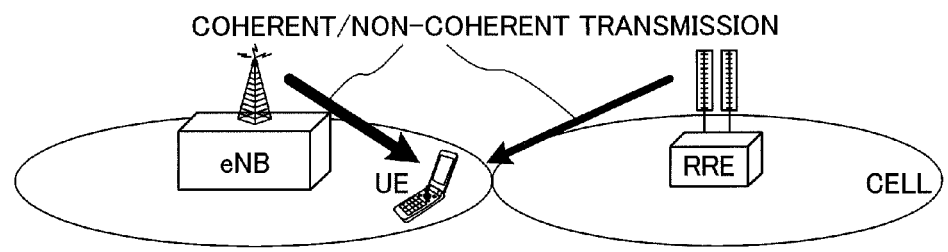
Figure 4C:
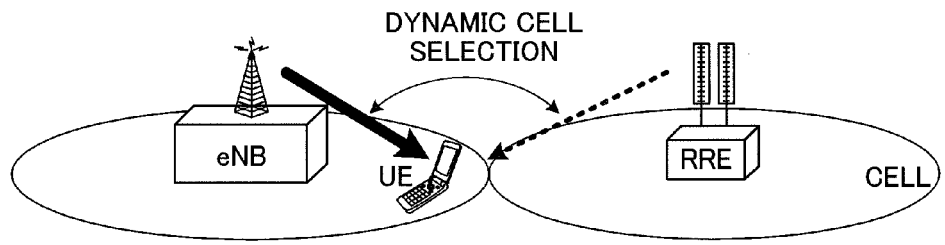

Now, downlink CoMP transmission will be described using FIG. 4. Downlink CoMP transmission includes coordinated scheduling/coordinated beamforming (CS/CB), and joint processing. Coordinated scheduling/coordinated beamforming refers to a method of transmitting a shared data channel from only one cell to one user terminal UE, and, as shown in FIG. 4A, allocates radio resources in the frequency/space domain, taking into account interference from other cells and interference against other cells. Meanwhile, joint processing refers to a method of transmitting a shared data channel from a plurality of cells at the same time by applying precoding, and includes joint transmission to transmit a shared data channel from a plurality of cells to one user terminal UE, as shown in FIG. 4B, and dynamic point selection (DPS) to select one cell dynamically and transmit a shared data channel, as shown in FIG. 4C. There is also a transmission mode referred to as "dynamic point blanking (DPB)," which stops data transmission in a certain region with respect to a transmission point that causes interference.

Figure 5A:
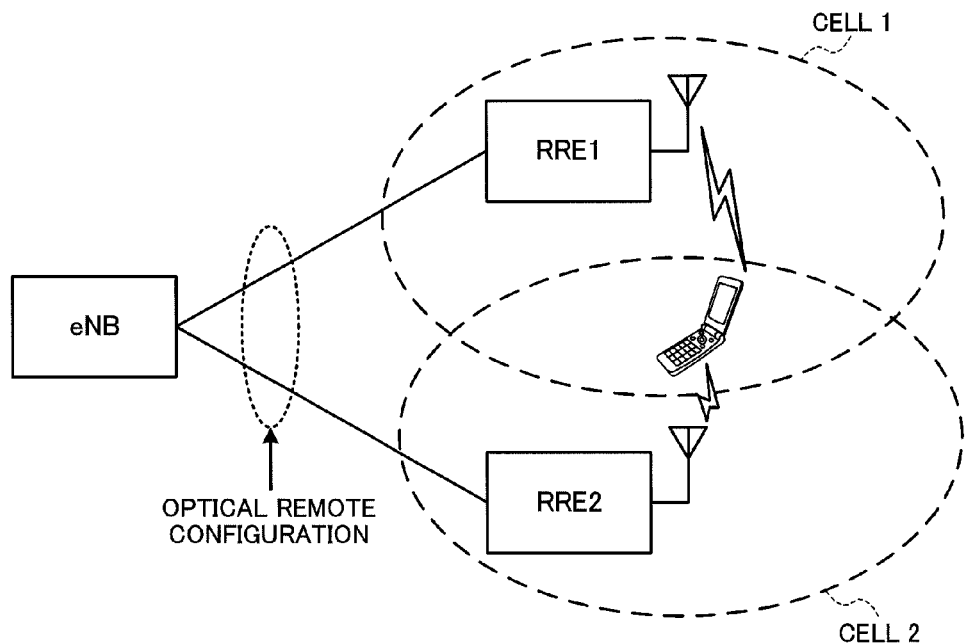
FIG. 5 provides schematic diagrams each showing a configuration of a radio base station apparatus applied to coordinated multi-point transmission/reception.
Figure 5B:
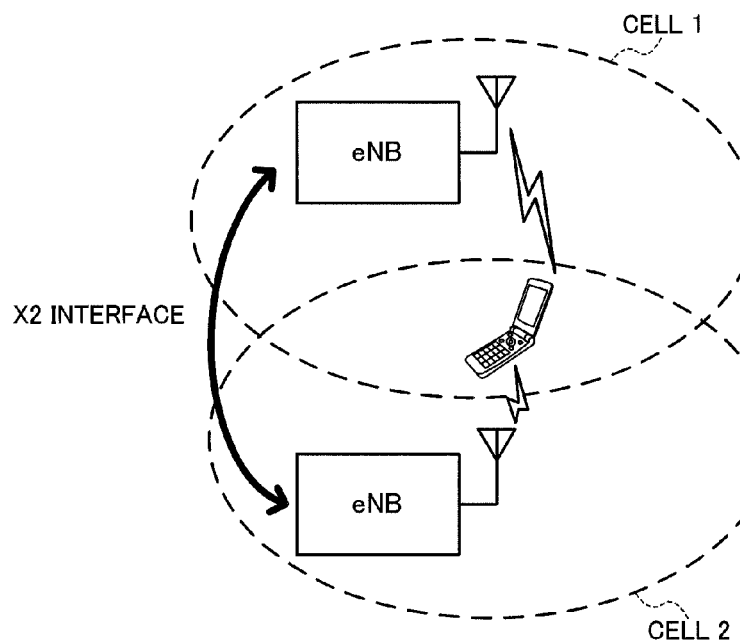

As for the configuration to implement CoMP transmission/reception, there are, for example, a configuration (centralized control based on an RRE configuration) to include a plurality of remote radio equipment (RREs) that are connected with a radio base station apparatus (radio base station apparatus eNB) by optical fiber and so on, as shown in FIG. 5A, and a configuration (autonomous distributed control based on an independent base station configuration) of a radio base station apparatus (radio base station apparatus eNB), as shown in FIG. 5B. Note that, although FIG. 5A shows a configuration to include a plurality of remote radio equipment RREs, it is equally possible to use a configuration to include only single remote radio equipment RRE, as shown in FIG. 4.

In the configuration shown in FIG. 5A (RRE configuration), remote radio equipment RRE 1 and RRE 2 are controlled in a centralized fashion in a radio base station apparatus eNB. In the RRE configuration, the radio base station apparatus eNB (central base station) that performs baseband signal processing and control for a plurality of remote radio equipment RREs, and each cell (that is, each remote radio equipment RRE) are connected by baseband signals using optical fiber, so that it is possible to execute radio resource control between the cells in the central base station altogether. That is, the problems of signaling delay and overhead between radio base station apparatus eNBs, which become problems in an independent base station configuration, are insignificant, and high-speed radio resource control between cells becomes comparatively easy. Consequently, in the RRE configuration, it is possible to apply a method to use fast signal processing between cells such as simultaneous transmission of a plurality of cells, to the downlink.

On the other hand, in the configuration shown in FIG. 5B (an independent base station configuration), a plurality of radio base station apparatus eNBs (or RREs) each perform radio resource allocation control such as scheduling. In this case, timing information and radio resource allocation information such as scheduling are transmitted to one radio base station apparatus eNB, in accordance with need, using an X2 interface between the radio base station apparatus eNB of cell 1 and the radio base station apparatus eNB of cell 2, for coordination between the cells.

CoMP transmission is applied to improve the throughput of user terminals located on cell edges. Consequently, control is designed to apply CoMP transmission when there is a user terminal located on a cell edge. In this case, a radio base station apparatus determines the difference between the quality information of each cell provided from the user terminal (for example, the RSRP (Reference Signal Received Power), the RSRQ (Reference Signal Received Quality), the SINR (Signal Interference plus Noise Ratio) and so on), and, when the difference is equal to or less than a threshold value—that is, when there is a small difference in quality between the cells—decides that the user terminal is located on a cell edge, and applies CoMP transmission. On the other hand, when the difference between the quality information of each cell exceeds the threshold value—that is, when there is a significant quality difference between the cells—the radio base station apparatus decides that the user terminal is close to the radio base station apparatus of one cell and that the user terminal is near the center of the cell, and does not apply CoMP transmission.

When CoMP transmission is applied, the user terminal feeds back CSI with respect to each of a plurality of CoMP cells to the radio base station apparatus (the radio base station apparatus of the serving cell). On the other hand, when CoMP transmission is not applied, the user terminal feeds back CSI with respect to the serving cell to the radio base station apparatus.

As described above, in the LTE-A system, a scenario to conduct CoMP transmission in a carrier aggregation environment may be possible. In this scenario, a user terminal has to feed back a plurality of pieces of CSI with respect to a plurality of transmission points of varying interference levels.

Figures 6A, 6B:
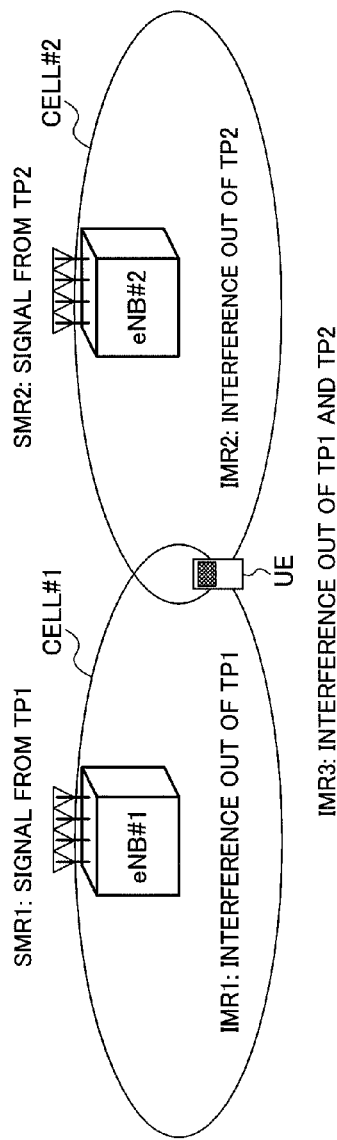
FIG. 6 provides diagrams for explaining problems when CoMP transmission is applied to the framework of carrier aggregation.

For example, when, as shown in FIG. 6A, the case where a user terminal UE is present on the cell edges of cell #1 and cell #2 and radio base station apparatus eNB #1 (transmission point (TP) 1) of cell #1 and radio base station apparatus eNB #2 (TP 2) of cell #2 carry out CoMP transmission, the four patterns of CSI shown in FIG. 6B may be possible. That is, as CSI, CSI 1, which is an indicator of interference outside one TP (TP 1) that is determined using TP 1 (CSI-RS resource 1), CSI 3, which is an indicator of interference outside two TPs (TP 1 and TP 2) that are determined using TP 1 (CSI-RS resource 1), CSI 2, which is an indicator of interference outside one TP (TP 2) determined using TP 2 (CSI-RS resource 2), and CSI 4, which is an indicator of interference outside two TPs (TP 1 and TP 2) determined using TP 2 (CSI-RS resource 1). Here, if SMR (Signal Measurement Resource) 1 is the signal component of TP 1, IMR (Interference Measurement Resource) 1 is the interference component outside TP 1, SMR 2 is the signal component from TP 2, IMR 2 is the interference component outside TP 2, and IMR 3 is the interference component outside TP 1 and TP 2, CSI 1 is determined from SMR 1 and IMR 1, CSI 2 is determined from SMR 2 and IMR 2, CSI 3 is determined from SMR 1 and IMR 3, and CSI 4 is determined from SMR 2 and IMR 3.

However, the framework of carrier aggregation is presently designed to feed back one piece of CSI to each cell, and, when CoMP transmission is applied, provides no support for feeding back a plurality of pieces of CSI with respect to each transmission point.

So, the present inventors have conceived of changing the way to use the CSI request field for downlink control information (DCI) and/or higher layer signaling (RRC signaling, MAC signaling, broadcast signals and so on), to support feeding back a plurality of pieces of CSI with respect to each transmission point upon CoMP transmission, and arrived at the present invention.

The present invention covers the following three methods.

(First Method)

With the first method, when CoMP transmission is applied, a radio base station apparatus sends CSI set information on a set including at least one piece of CSI, through higher layer signaling, and also transmits CSI request information in downlink control information, and a user terminal feeds back CSI based on the CSI set information and the CSI request information.

With the first method, a plurality of pieces of CSI, which are defined in a plurality of combinations of CSI-RS resources (SMRs) and interference (IMRs), are grouped, and this group is allocated as a CSI set. Then, information about the set allocated in this way is reported to a user terminal through RRC signaling (or through MAC signaling, broadcast signals and so on). After that, when CoMP transmission is applied, the CSI set is reported in the CSI request field within DCI (A-CSI reporting).

With the first method, to be specific, first, the new table shown in FIG. 7A, which is used when CoMP is applied, is defined (step 1). This table is stored in a radio base station apparatus eNB and user terminal UEs. At this time, the radio base station apparatus determines a first set and a second set (CSI set information) for each user terminal as of when CoMP is applied (step 2). Here, as shown in FIG. 7B, CSI 1, CSI 2 and CSI 3 are the first set, CSI 4 is the second set. Note that how to form groups and how to allocate these groups to CSI sets are determined as appropriate by the radio base station apparatus, based on CSI feedback overhead, the total number of pieces of CSI, the granularity of CSI, the capabilities of user terminal UEs, the CoMP transmission method and so on.

Referring to FIG. 7A, when the value of the two-bit A-CSI trigger field (CSI request field) is "00," this means that "A-CSI is not transmitted." Also, when the value of the A-CSI trigger field is "01," this means that "A-CSI with respect to a serving cell when interference outside the serving cell is assumed is transmitted." Note that the A-CSI trigger field value "01" may be defined so that the same value is provided as in Rel. 10 LTE. Also, when the value of the A-CSI trigger field is "10," this means that "the CSI of the first set is transmitted as A-CSI through higher layer signaling." Also, when the value of the A-CSI trigger filed is "11," this means that "the CSI of the second set is transmitted as A-CSI through higher layer signaling."

When CoMP is applied, the radio base station apparatus eNB transmits information about the sets determined as described above (CSI set information) to the user terminals through RRC signaling (or through MAC signaling, broadcast signals and so on) (step 3). This set information refers to information in which CSI 1, CSI 2 and CSI 3 are the first set and CSI 4 is the second set. Next, when CoMP is applied, the radio base station apparatus eNB transmits CSI request information (the bit information shown in FIG. 7A) to a user terminal by using DCI (step 4). For example, the radio base station apparatus eNB transmits the bits "10" to the user terminal using DCI, when CoMP is applied.

Then, the user terminal UE feeds back CSI to the radio base station apparatus eNB in accordance with the CSI request information and the CSI set information (step 5). For example, when the user terminal UE receives the bits "10" in DCI, the user terminals UE knows that the CSI of the first set is going to be fed back, form the table shown in FIG. 7A. At this time, from the set information reported through RRC signaling (or through MAC signaling, broadcast signals and so on) from the radio base station apparatus eNB, the user terminal UE knows that the CSI of the first set means CSI 1, CSI 2 and CSI 3. Consequently, the user terminal UE feeds back CSI 1, CSI 2 and CSI 3 in the PUSCH signal.

(Second Method)

With the second method, when CoMP transmission is applied, the radio base station apparatus transmits information as to which interference is the interference component, as CSI request information in downlink control information, and a user terminal feeds back CSI based on the CSI request information. Information as to which interference is considered interference components means information as to the interference of cells other than which cells is the interference component.

With the second method, when CoMP transmission is applied, the interference components of the transmission points (which interference is made interference components) are reported to a user terminal (A-CSI reporting). By this means, reporting of set information that is reported with the first method becomes unnecessary, so that it is possible to reduce the overhead of signaling.

With the second method, to be specific, first, the new table shown in FIG. 8, which is used when CoMP is applied, is defined (step 1). This table is stored in a radio base station apparatus eNB and in user terminal UEs. Referring to FIG. 8, when the value of the two-bit A-CSI trigger field (CSI request field) is "00," this means that "A-CSI is not transmitted." Also, when the value of the A-CSI trigger field is "01," this means that "A-CSI with respect to a serving cell when interference outside the serving cell is assumed is transmitted." Also, when the value of the A-CSI trigger field is "10," this means that "A-CSI as of when interference outside one transmission point is the interference component for all the serving cells is transmitted." Also, when the value of the A-CSI trigger filed is "11," this means that "A-CSI as of when interference outside one transmission point is the interference component for all the serving cells is transmitted."

When CoMP is applied, the radio base station apparatus eNB transmits CSI request information (the bit information shown in FIG. 8) to the user terminal using DCI (step 2). For example, the radio base station apparatus eNB transmits the bits "11" to the user terminal in DCI when CoMP is applied.

Then, the user terminal UE feeds back CSI to the radio base station apparatus eNB in accordance with the CSI request information (step 3). For example, when the user terminal UE receives the bits "11" in DCI, the user terminal UE knows, in accordance with the table shown in FIG. 8, that A-CSI, in which interference outside two transmission points is the interference component for all the serving cells, is going to be transmitted. At this time, the user terminal UE feeds back CSI 3 and CSI 4, which are A-CSI in which interferences outside two transmission points is the interference component, in the PUSCH signal.

(Third Method)

With the third method, when CoMP transmission is applied, the radio base station apparatus sends TP set information on a set including at least one transmission point through higher layer signaling, and also transmits CSI request information in downlink control information, and the user terminal feeds back CSI based on the TP set information and the CSI request information.

With the third method, when a transmission point set is determined and CoMP transmission is applied, interference components (which interference is considered interference components) of transmission points and a set of transmission points are reported to the user terminal through RRC signaling (or through MAC signaling, broadcast signals and so on) (A-CSI reporting).

With the third method, to be specific, first, the new table shown in FIG. 9, which is used when CoMP is applied, is defined (step 1). This table is stored in a radio base station apparatus eNB and in user terminal UEs. At this time, the radio base station apparatus determines a first set and a second set (TP set information) for each user terminal as of when CoMP is applied (step 2). Here, TP 1 belongs to the first set, and TP 2 belongs to the second set. Note that how to allocate the TPs to sets is determined as appropriate by the radio base station apparatus, based on the total number of TPs, CSI feedback overhead, the capabilities of user terminal UEs, the CoMP transmission method and so on.

In FIG. 9, when the value of the three-bit A-CSI trigger field (CSI request field) is "000," this means that "A-CSI is not transmitted." Also, when the value of the A-CSI trigger filed is "001," this means that "A-CSI with respect to a serving cell when interference outside the serving cell is assumed is transmitted." Also, when the value of the A-CSI trigger field is "010," this means that "A-CSI, in which interference outside one transmission point is the interference component for the serving cell of the first set, is transmitted." Also, when the value of the A-CSI trigger field is "011," this means that "A-CSI, in which interference outside one transmission point is the interference component for the serving cell of the second set, is transmitted." Also, when the value of the A-CSI trigger field is "100," this means that "A-CSI, in which interference outside two transmission points is the interference component for the serving cell of the first set, is transmitted." Also, when the value of the A-CSI trigger field is "101," this means that "A-CSI, in which interference outside two transmission points is the interference component for the serving cell of the second set, is transmitted."

When CoMP is applied, the radio base station apparatus eNB transmits information about the sets determined as described above (TP set information) to the user terminals through RRC signaling (or through MAC signaling, broadcast signals and so on) (step 3). This set information refers to information in which TP 1 (SMR 1) is the first set and TP 2 (SMR 2) is the second set. Next, when CoMP is applied, the radio base station apparatus eNB transmits CSI request information (the bit information shown in FIG. 9) to the user terminal UE using DCI (step 4). For example, the radio base station apparatus eNB transmits the bits "100" to the user terminal in DCI when CoMP is applied.

Then, the user terminal UE feeds back CSI to the radio base station apparatus eNB in accordance with the CSI request information and the TP set information (step 5). For example, when the user terminal UE receives the bits "100" in DCI, the user terminal UE knows, from the table shown in FIG. 9, that A-CSI, in which interference outside two transmission points is the interference component for the serving cell of the first set, is going to be transmitted. At this time, the user terminal UE knows that the TP of the first set means TP 1, from the set information reported from the radio base station apparatus eNB through RRC signaling (or through MAC signaling, broadcast signals and so on). Consequently, the user terminal UE feeds back CSI 3 in the PUSCH signal.

Next, an example of a scenario to implement the above-described signaling method of the present invention will be described. The scenario shown in FIG. 10A is a scenario to apply CoMP transmission to a user terminal UE in a system configuration in which the cell of transmission point TP 1 (eNB) and the cells of transmission points TP 2 and TP 3 are overlaid.

Now, assuming that SMR 1 is the signal component from TP 1 and IMR 1 is the interference component outside TP 1, SMR 2 is the signal component from TP 2 and IMR 2 is the interference component outside TP 2, SMR 3 is the signal component from TP 3 and IMR 3 is the interference component outside TP 3, and IMR 4 is the interference component outside TP 1, TP 2 and TP 3, CSI 1 is determined from SMR 1 and IMR 1, CSI 2 is determined from SMR 2 and IMR 2, CSI 3 is determined from SMR 3 and IMR 3, CSI 4 is determined from SMR 2 and IMR 4, and CSI 5 is determined from SMR 3 and IMR 4.

Figures 10A, 10B:
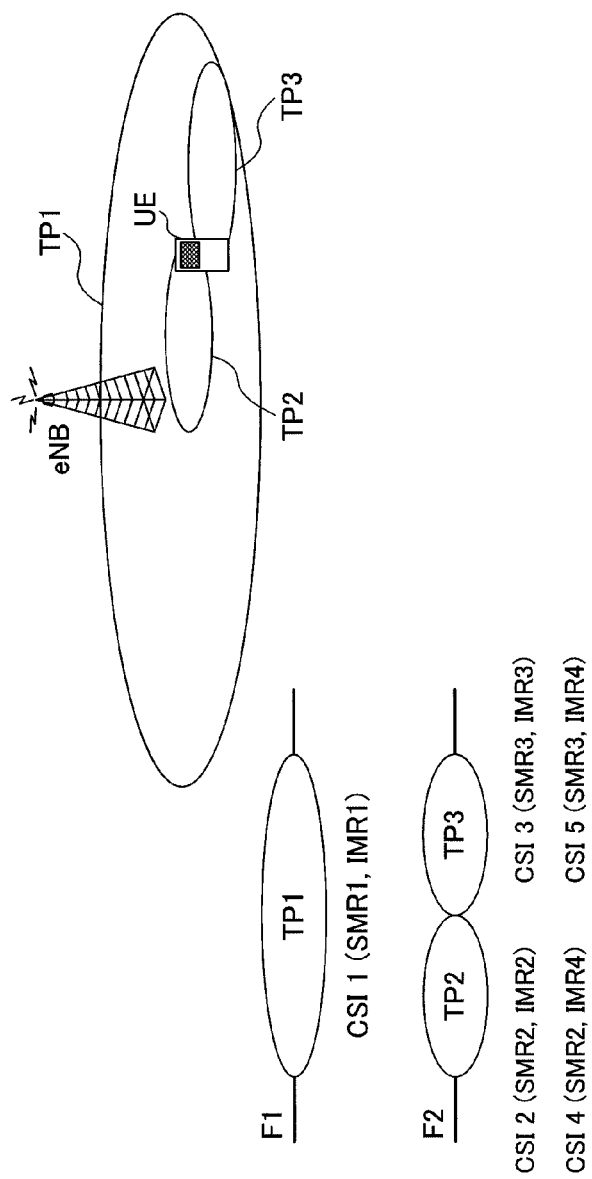
FIG. 10 provides diagrams for explaining a scenario to make possible the signaling method of the present invention.

In this case, if the frequency of TP 1 is frequency F1 and the frequency of TP 2 and TP 3 is frequency F2, CSI that is acquired by making interference outside one TP in the same frequency the interference component and CSI that is acquired by making interference outside two TPs in the same frequency the interference component can be classified as shown in FIG. 10B. That is, the CSI that is acquired by making interference outside one TP in the same frequency the interference component refers to CSI 1, CSI 2 and CSI 3, and the CSI that is acquired by making interference outside two TPs in the same frequency the interference component refers to CSI 4 and CSI 5. Consequently, by using the classification shown in FIG. 10B, it is possible to apply the above first to third methods. To be more specific, with the first method, the first set of CSI is CSI 1, and the second set of CSI is CSI 2 to CSI 5. With the third method, the first set of TPs is TP 1, and the second set of TPs is TP 2 and TP 3.

Figures 11A, 11B:
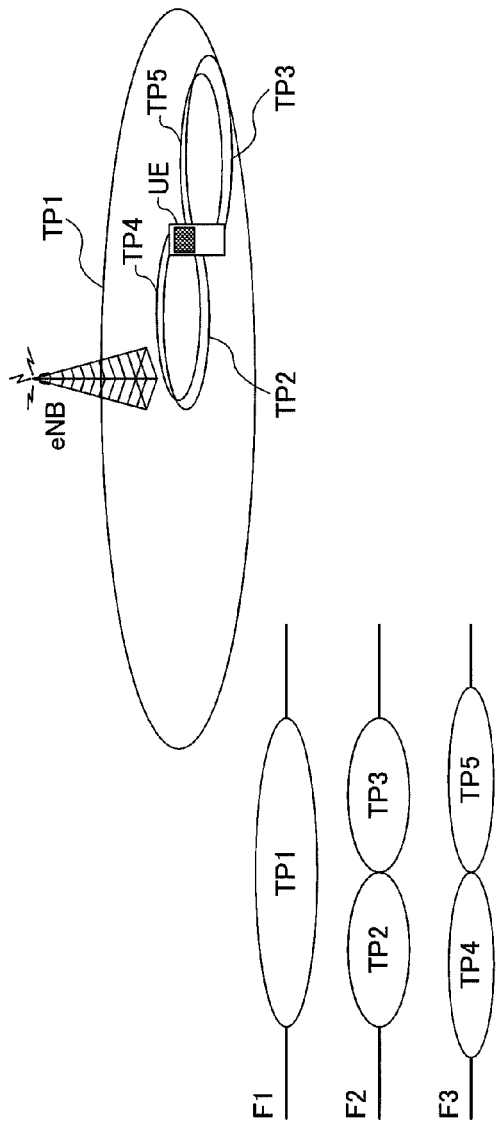
FIG. 11 provides diagrams for explaining a scenario to make possible the signaling method of the present invention.

The scenario shown in FIG. 11A is a scenario to apply CoMP transmission to a user terminal UE in a system configuration, in which the cell of transmission point TP 1 (eNB) and the cells of transmission points TP 2 and TP 3 are overlaid, and, in which, furthermore, the cells of transmission points TP2 and TP3 and the cells of TP 4 and TP 5 are overlaid.

Now, if SMR 1 is the signal component from TP 1 and IMR 1 is the interference component outside TP 1, SMR 2 is the signal component from TP 2 and IMR 2 is the interference component outside TP 2, SMR 3 is the signal component from TP 3 and IMR 3 is the interference component outside TP 3, SMR 4 is the signal component from TP 4 and IMR 4 is the interference component outside TP 4, and SMR 5 is the signal component from TP 5 and IMR 5 is the interference component outside TP 5, and IMR 6 is the signal component outside TP 1 to TP 5, CSI 1 is determined from SMR 1 and IMR 1, CSI 2 is determined from SMR 2 and IMR 2, CSI 3 is determined from SMR 3 and IMR 3, CSI 4 is determined from SMR 4 and IMR 4, CSI 5 is determined from SMR 5 and IMR 5, CSI 6 is determined from SMR 2 and IMR 6, CSI 7 is determined from SMR 3 and IMR 6, CSI 8 is determined from SMR 4 and IMR 6, and CSI 9 is determined from SMR 5 and IMR 6.

In this case, if the frequency of TP 1 is frequency F1, the frequency of TP 2 and TP 3 is frequency F2 and the frequency of TP 4 and TP 5 is frequency F3, CSI that is acquired by making interference outside one TP in the same frequency the interference component and CSI that is acquired by making interference outside two TPs in the same frequency the interference component can be classified as shown in FIG. 11B. That is, the CSI that is acquired by making interference outside one TP in the same frequency the interference component refers to CSI 1, CSI 2, CSI 3, CSI 4 and CSI 5, and the CSI that is acquired by making interference outside two TPs in the same frequency the interference component refers to CSI 6, CSI 7, CSI 8 and CSI 9. Consequently, by using the classification shown in FIG. 11B, it is possible to apply the above first to third methods.

Figures 12A, 12B:
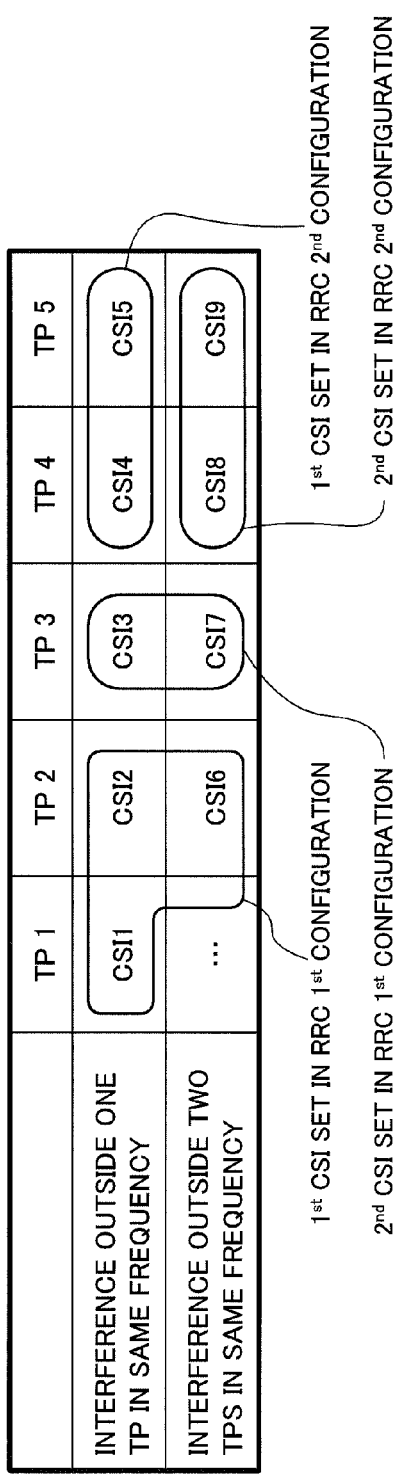
FIG. 12 provides diagrams for explaining a case where the first method is implemented in the scenario shown in FIG. 11.

For example, CSI sets are reported using a plurality of higher layer signaling (RRC signaling, MAC signaling, broadcast signals and so on). To be more specific, as shown in FIG. 12A, CSI 1, CSI 2 and CSI 6 are a first set of the first RRC signaling (or MAC signaling, broadcast signals and so on), CSI 3 and CSI 7 are a second set of the first RRC signaling (or MAC signaling, broadcast signals and so on), CSI 4 and CSI 5 are a first set of second RRC signaling (or MAC signaling, broadcast signals and so on), and CSI 8 and CSI 9 are a second set of second RRC signaling (or MAC signaling, broadcast signals and so on). By this means, when CoMP is applied, the radio base station apparatus eNB transmits CSI request information to the user terminal UE using the table shown in FIG. 12B.

Also, using an extended CSI request field, more CSI sets are supported (three bits here). To be more specific, as shown in FIG. 13A, CSI 1, CSI 2 and CSI 6 are a first set, CSI 3 and CSI 7 are a second set, CSI 4 and CSI 5 are a third set, and CSI 8 and CSI 9 are a fourth set. By this means, when CoMP is applied, the radio base station apparatus eNB transmits CSI request information to the user terminal UE using the table shown in FIG. 13B. In FIG. 13B, when the value of the three-bit A-CSI trigger field (CSI request field) is "000," this means that "A-CSI is not transmitted." Also, when the value of the A-CSI trigger field is "001," this means that "A-CSI with respect to a serving cell when interference outside the serving cell is assumed is transmitted." Also, when the value of the A-CSI trigger field is "010," this means that "the CSI of the first set is transmitted as A-CSI through higher layer signaling." Also, when the value of the A-CSI trigger field is "011," this means that "the CSI of the second set is transmitted as A-CSI through higher layer signaling." Also, when the value of the A-CSI trigger field is "100," this means that "the CSI of the third set is transmitted as A-CSI through higher layer signaling." Also, when the value of the A-CSI trigger field is "101," this means that "the CSI of the fourth set is transmitted as A-CSI through higher layer signaling." By this means, when CoMP is applied, the radio base station apparatus eNB transmits CSI request information to the user terminal UE using the table shown in FIG. 13B.

Also, the CSI request field is transmitted using conventional DCI bits (for example, CIF (Carrier Indicator Field) bits). To be more specific, as shown in FIG. 14A, CSI 1, CSI 2 and CSI6 are a first set, CSI 3 and CSI 7 are a second set, CSI 4 and CSI 5 are a third set, and CSI 8 and CSI 9 are a fourth set. By this means, the radio base station apparatus eNB transmits CSI request information to the user terminal UE using the table shown in FIG. 14B, when CoMP is applied. In FIG. 14B, a two-bit A-CSI trigger field (CSI request field) and a CIF are combined. When the value of the two-bit A-CSI trigger field is "00" and the value of the CIF is "000," this means that "A-CSI is not transmitted." Also, when the value of the two-bit A-CSI trigger field is "01" and the value of the CIF is "000," this means that "A-CSI with respect to a serving cell when interference outside the serving cell is assumed is transmitted." Also, when the value of the two-bit A-CSI trigger field is "10" and the value of the CIF is "000," this means that "the CSI of the first set is transmitted as A-CSI by higher layer signaling." Also, when the value of the two-bit A-CSI trigger field is "11" and the value of the CIF is 000," this means that "the CSI of the second set is transmitted as A-CSI by higher layer signaling." Also, when the value of the two-bit A-CSI trigger field is "10" and the value of the CIF is "001," this means that "the CSI of the third set is transmitted as A-CSI by higher layer signaling." Also, when the value of the two-bit A-CSI trigger field is "11" and the value of the CIF is "001," this means that "the CSI of the first set is transmitted as A-CSI by higher layer signaling." By this means, the radio base station apparatus eNB transmits CSI request information to the user terminal UE using the table shown in FIG. 14B, when CoMP is applied.

Although the first to third methods have been described up till here, in all of these methods, it is equally possible to use the UL grant field instead of the A-CSI trigger field. Also, although cases have been described as examples with the above first method to the third method where one type of a table is used in each method, with the present invention, it is equally possible to provide a plurality of types of tables in advance and switch around and use these plurality of types of tables with respect to different time resources and frequency resources. For example, different tables may be used for radio resources that are classified into a plurality of types in time (for example, odd-numbered subframes and even-numbered subframes). As for the method of switching around a plurality of types of tables, it is possible to allow a radio base station apparatus to designate the tables to use through signaling, by means of higher layer signaling (RRC signaling, MAC signaling, broadcast signals and so on) and downlink control channels (the PDCCH, user terminal-specific PDCCHs (enhanced-PDCCHs) and so on), and it is also possible to designate the table which user terminals use, based on the radio resource positions where control channels such as UL grants and so on are transmitted (for example, the positions of control channel elements). Also, although, with the above embodiment, case where the A-CSI trigger field is two bits have been described with the first method and the second method and a case has been described with the third method where the A-CSI trigger field is three bits, the present invention is by no means limited to these, and the A-CSI trigger field may be three bits or more with respect to the first method and the second method, and the A-CSI trigger field may be two bits or not less than four bits with respect to the third method. In this case, as has been described above, it may be possible to increase the amount of information to report, without increasing the number of bits in the A-CSI trigger field, by using conventional DCI bits (for example, CIF bits).

By this means, according to the present invention, when CoMP transmission is applied in the framework of carrier aggregation, it is possible to feed back a plurality of pieces of CSI with respect to each transmission point.

Now, a radio communication system 1 having user terminals 10 and a radio base station apparatus 20 according to an embodiment of the present invention will be described below with reference to FIG. 15. The user terminals 10 and the radio base station apparatus 20 support LTE-A.

Figure 15:
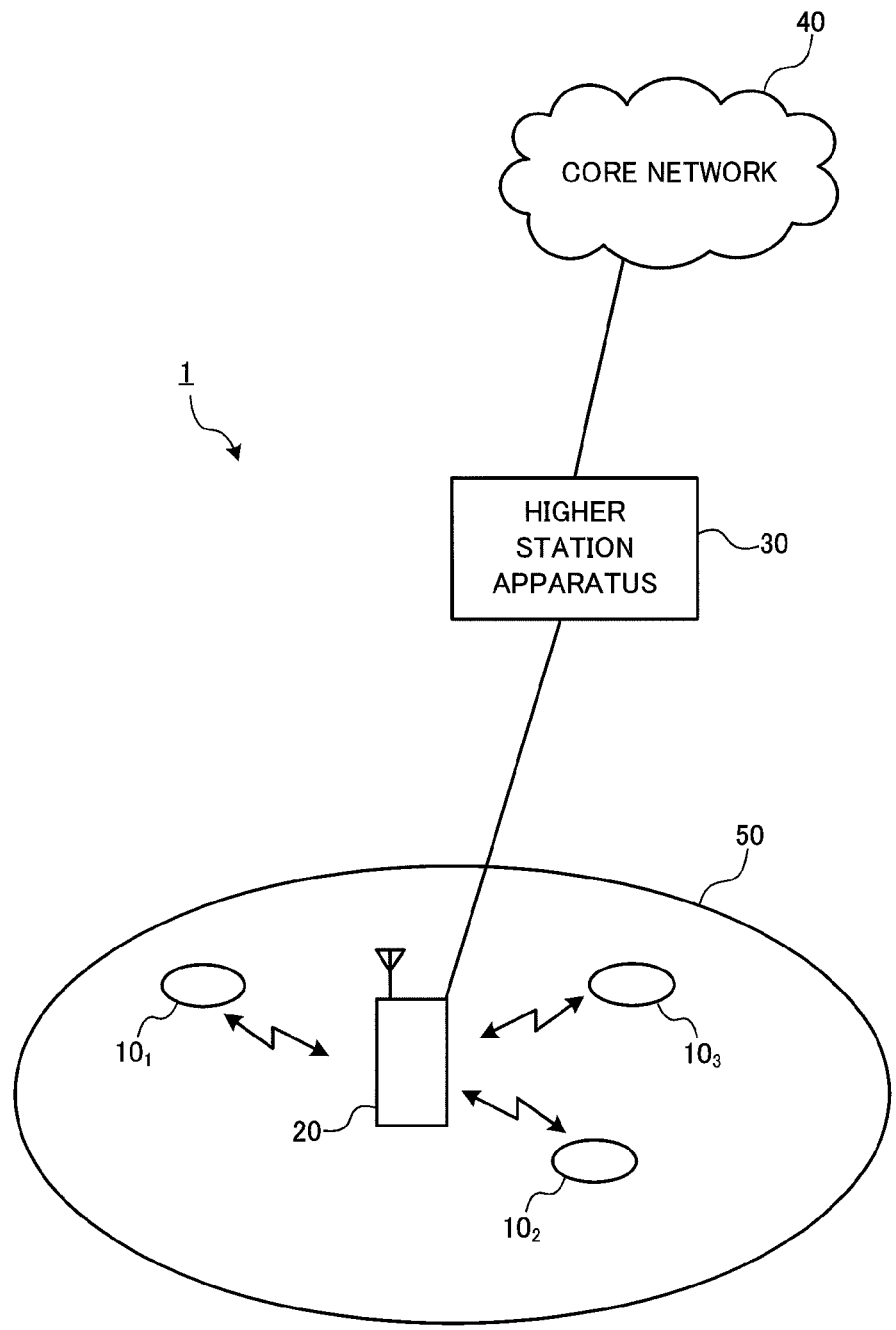
FIG. 15 is a diagram for explaining a configuration of a radio communication system according to an embodiment of the present invention.

As shown in FIG. 15, the radio communication system 1 is configured to include a radio base station apparatus 20, and a plurality of user terminals 10 ($10_1$, $10_2$, $10_3$, . . . $10_n$, where n is an integer to satisfy n>0) that communicate with the radio base station apparatus 20. The radio base station apparatuses 20 are connected with a higher station apparatus 30, and this higher station apparatus 30 is connected with a core network 40. The user terminals 10 are able to communicate with the radio base station apparatus 20 in a cell 50.

Note that the higher station apparatus 30 may be, for example, an access gateway apparatus, a radio network controller (RNC), a mobility management entity (MME) and so on, but is by no means limited to these. The higher station apparatus 30 may be included in a core network 40.

Although the user terminals ($10_1$, $10_2$, $10_3$, . . . $10_n$) are LTE-A terminals unless specified otherwise, but may be LTE terminals as well. Also, although for ease of explanation, the user terminals 10 will be described to perform radio communication with the radio base station apparatus 20, more generally, user equipment (UE), which may include both mobile terminals and fixed terminals, may be used as well.

In the radio communication system 1, as a radio access scheme, OFDMA (Orthogonal Frequency Division Multiple Access) is applied to the downlink. Meanwhile, SC-FDMA (Single Carrier Frequency Division Multiple Access) and clustered DFT-spreading OFDM are applied to the uplink.

OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one resource block or continuous resource blocks, and allowing a plurality of terminals to use mutually different bands. Clustered DFT-spreading OFDM is a scheme to realize uplink multiple access by allocating groups (clusters) of discontinuous, clustered subcarriers to one user terminal UE and applying discrete Fourier transform spreading OFDM to each cluster.

Here, communication channel configurations defined in LTE-A will be described. On the downlink, a PDSCH, which is used by each user terminal 10 on a shared basis, and downlink L1/L2 control channels (PDCCH, PCFICH, PHICH) are used. By means of the PDSCH, user data (including higher layer control signals)—that is, normal data signals—is transmitted. Transmission data is included in this user data. Note that the fundamental frequency blocks (CCs) and scheduling information allocated to the user terminals 10 in the radio base station 20 are reported to the user terminals 10 by a downlink control channel.

The higher control signals include RRC signaling (or MAC signaling, broadcast signals and so on), which reports the increase/decrease of the number of carrier aggregations, the uplink radio access scheme (SC-FDMA/clustered DFT-spreading OFDM) that is applied to each component carrier, to the user terminals 10.

On the uplink, a PUSCH, which is used by each user terminal 10 on a shared basis, and a PUCCH, which is an uplink control channel, are used. User data is transmitted by means of this PUSCH. Downlink CSI (CQI/PMI/RI), ACK/NACK and so on are transmitted by the PUCCH. Also, intra-subframe frequency hopping is adopted in SC-FDMA.

Figure 16:
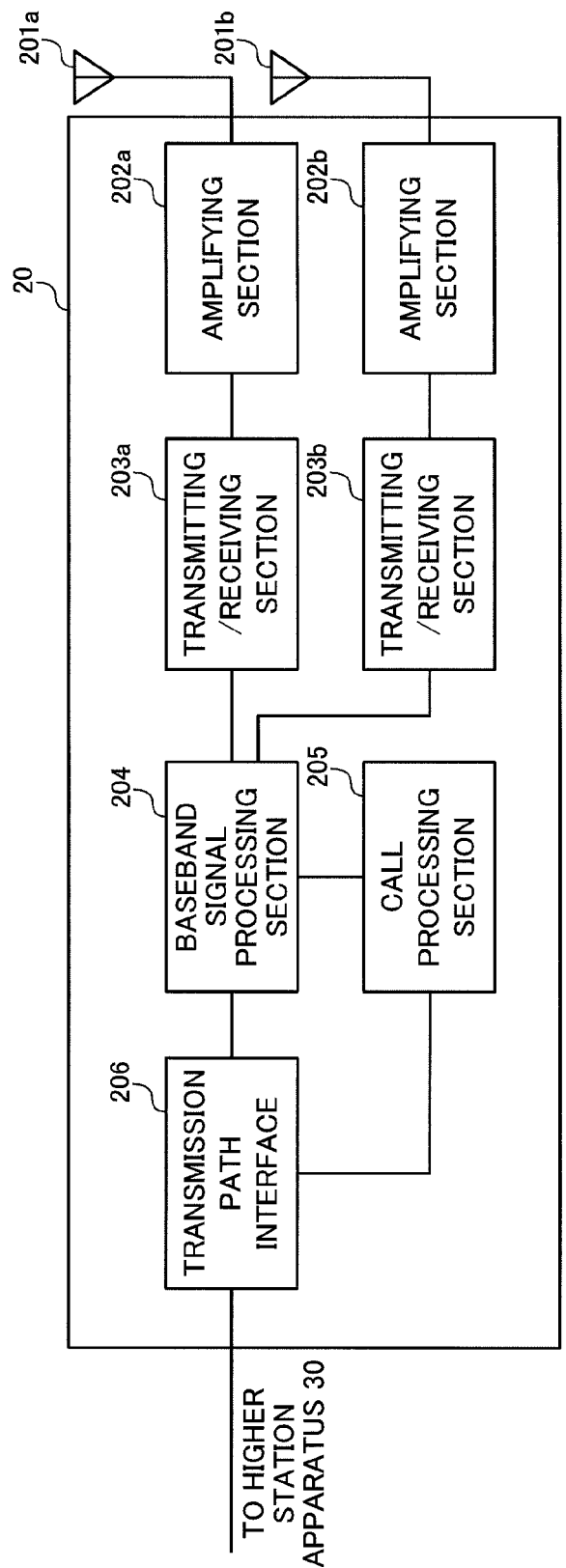
FIG. 16 is a functional block diagram showing an overall configuration of a radio base station apparatus according to an embodiment of the present invention.

An overall configuration of the radio base station apparatus 20 according to the present embodiment will be described with reference to FIG. 16. The radio base station apparatus 20 has transmitting/receiving antennas 201a and 201b, amplifying sections 202a and 202b, transmitting/receiving sections 203a and 203b, a baseband signal processing section 204, a call processing section 205, and a transmission path interface 206.

User data that is transmitted from the radio base station apparatus 20 to the user terminals 10 is input from the higher station apparatus 30 of the radio base station apparatus 20, into the baseband signal processing section 204, via the transmission path interface 206.

The baseband signal processing section 204 performs a PDCP layer process such as assigning sequence numbers, division and coupling of user data, RLC (Radio Link Control) layer transmission processes such as an RLC retransmission control transmission process, MAC (Medium Access Control) retransmission control, for example, an HARQ transmission process, scheduling, transport format selection, channel coding, an inverse fast Fourier transform (IFFT) process, and a precoding process.

The baseband signal processing section 204 reports control information for allowing radio communication in the cell 50 to the user terminals 10 by a broadcast channel. The broadcast information to allow communication in the cell 50 includes, for example, the system bandwidth on the uplink and the downlink, root sequence identification information (root sequence indices) for generating random access preamble signals in the PRACH, and so on.

Baseband signals that are output from the baseband signal processing section 204 are converted into a radio frequency band in the transmitting/receiving sections 203a and 203b. The RF signals are amplified in the amplifying sections 202 and output to the transmitting/receiving antennas 201a and 201b.

The radio base station apparatus 20 receives the transmission waves transmitted from the user terminals 10 in the transmitting/receiving antennas 201a and 201b. The radio frequency signals received in the transmitting/receiving antennas 201a and 201b are amplified in the amplifying sections 202a and 202b, converted into baseband signals through frequency conversion in the transmitting/receiving sections 203a and 203b, and input in the baseband signal processing section 204.

The baseband signal processing section 204 performs an FFT process, an IDFT process, error correction decoding, a MAC retransmission control receiving process, and RLC layer and PDCP layer receiving processes of the user data that is included in the baseband signal received from uplink transmission. The decoded signals are transferred to the higher station apparatus 30 through the transmission path interface 206.

The call processing section 205 performs call processing such as setting up and releasing communication channels, manages the state of the radio base station apparatus 20 and manages the radio resources.

Figure 17:
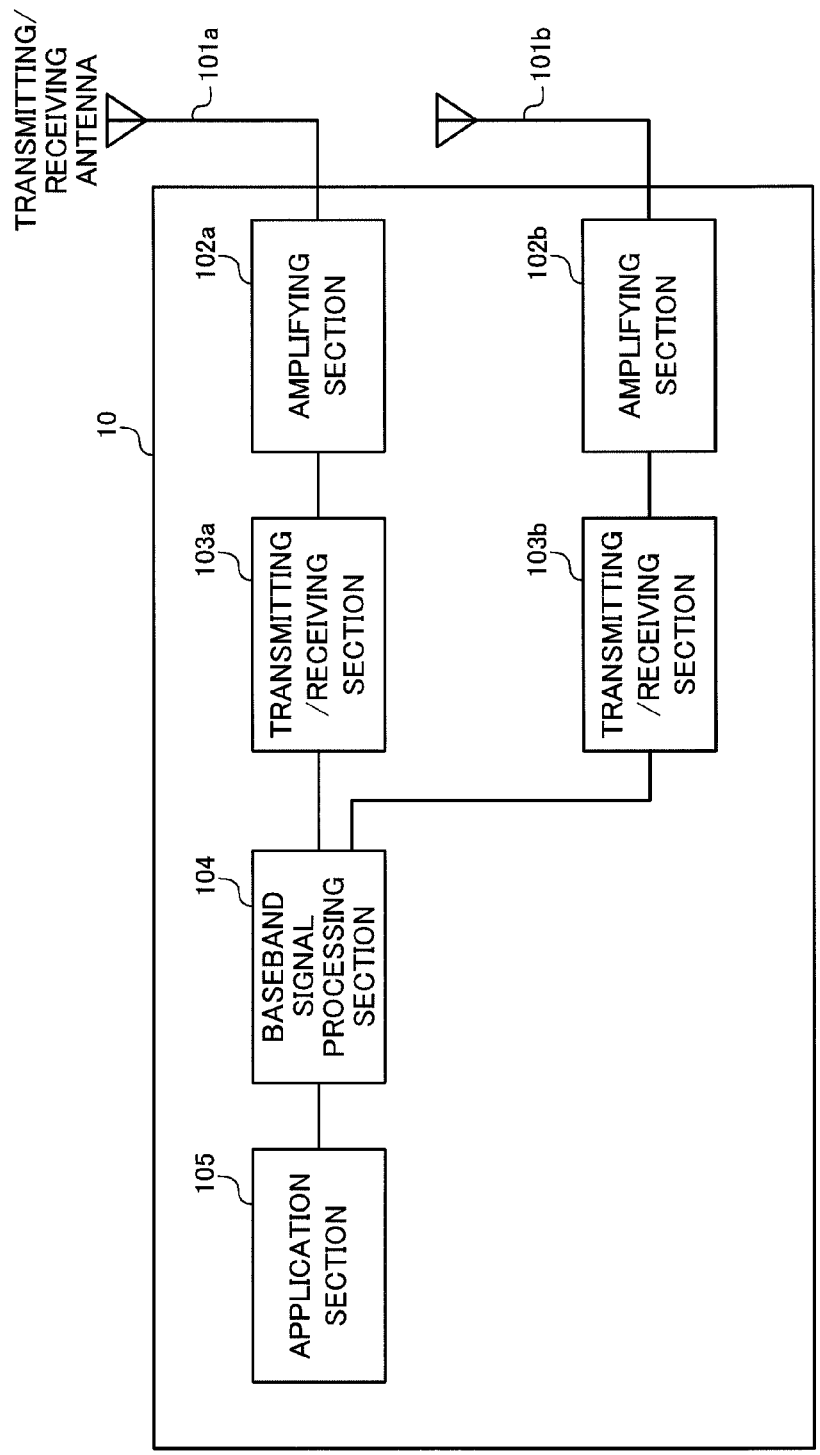
FIG. 17 is a functional block diagram showing an overall configuration of a user terminal according to an embodiment of the present invention.

Next, an overall configuration of a user terminal 10 according to the present embodiment will be described with reference to FIG. 17. A user terminal 10 has a plurality of transmitting/receiving antennas 101a and 101b, amplifying sections 102a and 102b, transmitting/receiving sections 103a and 103b, a baseband signal processing section 104, and an application section 105.

Radio frequency signals received in the transmitting/receiving antennas 101a and 101b are amplified in the amplifying sections 102a and 102b, and converted into baseband signals through frequency conversion in the transmitting/receiving sections 103a and 103b. The baseband signals are subjected to receiving processes such as an FFT process, error correction decoding and retransmission control, in the baseband signal processing section 104. In this downlink data, downlink user data is transferred to the application section 105. The application section 105 performs processes related to higher layers above the physical layer and the MAC layer. Also, in the downlink data, broadcast information is also transferred to the application section 105.

On the other hand, uplink user data is input from the application section 105 into the baseband signal processing section 104. The baseband signal processing section 104 performs a retransmission control (HARQ) transmission process, channel coding, a DFT process, and an IFFT process. The baseband signals output from the baseband signal processing section 104 are converted into a radio frequency band in the transmitting/receiving sections 103, and, after that, amplified in the amplifying sections 102a and 102b and transmitted from the transmitting/receiving antennas 101a and 101b.

Figure 18:
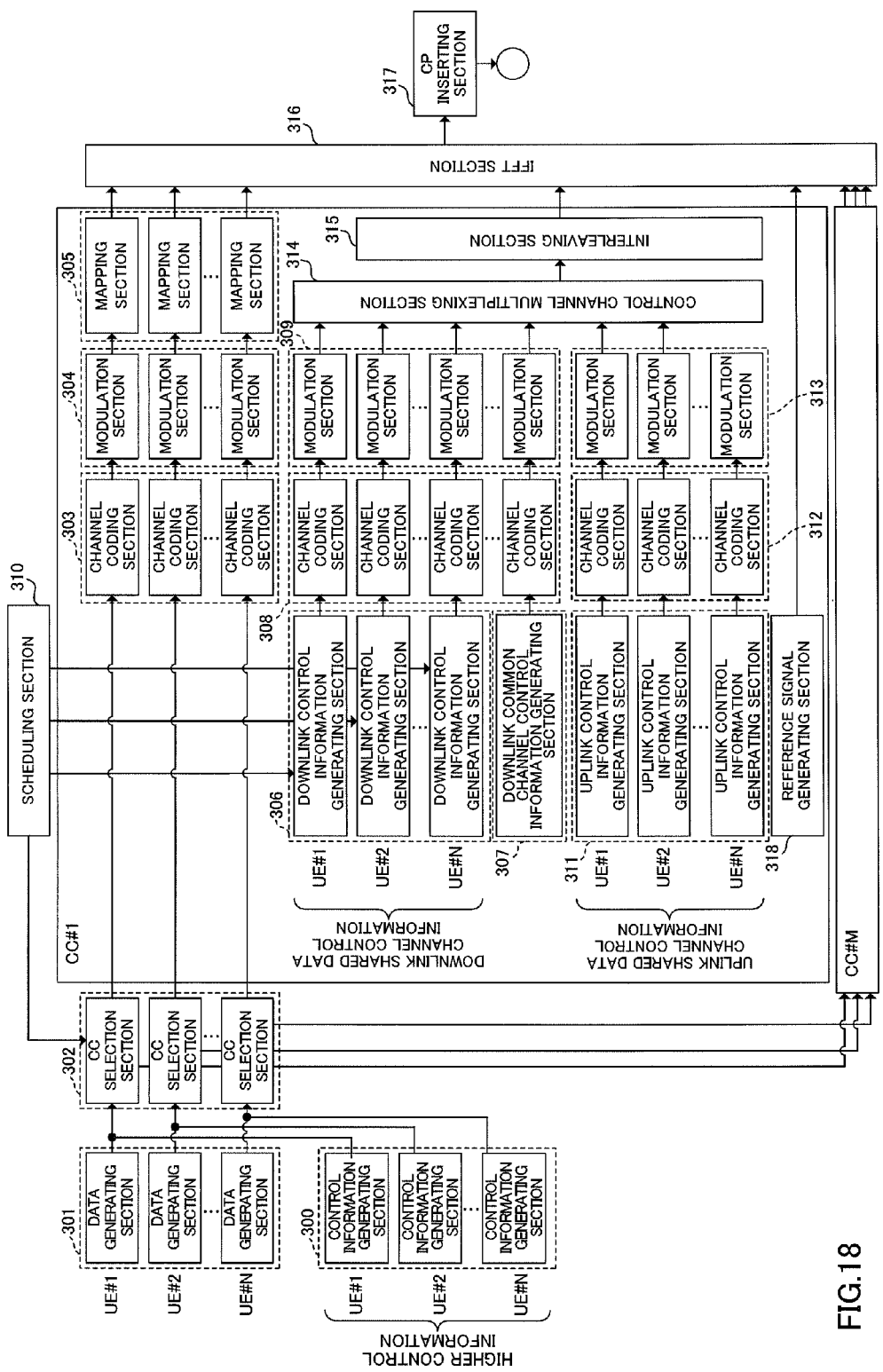
FIG. 18 is a functional block diagram showing a baseband processing section provided in a radio base station apparatus according to an embodiment, and part of higher layers.

FIG. 18 is a functional block diagram of a baseband signal processing section 204 and part of the higher layers provided in the radio base station apparatus 20 according to the present embodiment, and the function blocks of transmission processing sections are primarily illustrated for the baseband signal processing section 204. FIG. 18 shows an example of a base station configuration that can support M component carriers (CC #1 to CC #M). Transmission data for user terminals 10 under the radio base station apparatus 20 is transferred from the higher station apparatus 30 to the radio base station apparatus 20.

Control information generating sections 300 generate higher control signals to be transmitted and received through higher layer signaling (RRC signaling, MAC signaling, broadcast signals and so on). With the first method of the present invention, CSI set information is included in higher control signals. Also, with the third method of the present invention, TP set information is included in higher control signals. Also, higher control signals may include a command to request an addition/removal of component carrier CCs. Also, higher control signals may be generated on a per user basis as well.

Data generating sections 301 output transmission data transferred from the higher station apparatus 30 as user data separately.

Component carrier selection sections 302 select component carriers to be allocated to radio communication with the user terminals 10, on a per user basis. In accordance with the component carrier allocation information that is set in the component carrier selection sections 302 on a per user basis, higher control signals and transmission data are sorted to the channel coding sections 303 of the applicable component carriers.

A scheduling section 310 controls the allocation of component carriers to the user terminals 10 under control, according to the overall communication quality of the system band. Also, a primary component carrier (PCC) is determined from the component carriers that are selected on a per user terminal basis. The PCC may be switched dynamically or may be switched semi-statically.

Also, the scheduling section 310 controls the resource allocation for each component carrier. LTE terminal users LTE-A terminal users are scheduled separately. Also, the scheduling section 310 receives as input transmission data and retransmission commands from the higher station apparatus 30, and also receives as input channel estimation values and resource block CQIs from the receiving section having measured uplink received signals.

Also, the scheduling section 310 schedules downlink allocation information, uplink allocation information, and uplink and downlink shared channel signals with reference to the retransmission commands, channel estimation values and CQIs input from the higher station apparatus 30. A propagation path in mobile communication varies differently per frequency, due to frequency selective fading. So, upon transmission of user data, resource blocks of good communication quality are allocated to the user terminals 10, on a per subframe basis (which is referred to as "adaptive frequency scheduling"). In adaptive frequency scheduling, a user terminal 10 of good propagation path quality is selected and allocated to each resource block. Consequently, the scheduling section 310 allocates resource blocks, with which improvement of throughput is anticipated, using the CQI of each resource block, fed back from each user terminal 10.

Also, the scheduling section 310 controls the number of CCE aggregations in accordance with the conditions of the propagation path with the user terminals 10. The number of CCE aggregations is increased for cell edge users. Also, the MCS (coding rate and modulation scheme) to fulfill a predetermined block error rate with the assigned resource blocks is determined. Parameters to fulfill the MCS (coding rate and modulation scheme) determined in the scheduling section 310 are set in channel coding sections 303, 308 and 312, and in modulation sections 304, 309 and 313.

The baseband signal processing section 204 has channel coding sections 303, modulation sections 304 and mapping sections 305 to support the maximum number of users to multiplex, N, in one component carrier. The channel coding sections 303 perform channel coding of the shared data channel (PDSCH), formed with user data (including part of higher control signals) that is output from the data generating sections 301, on a per user basis. The modulation sections 304 modulate user data having been subjected to channel coding, on a per user basis. The mapping sections 305 map the modulated user data to radio resources.

Also, the baseband signal processing section 204 has generating sections (downlink control information generating sections 306 and uplink control information generating sections 311) that generate control information using a predetermined DCI format from a plurality of DCI formats. The plurality of DCI formats include a DCI format to have UL grants as the content (for example, DCI format 0/4) and a DCI format to have DL grant as the content (for example, DCI format 1A and so on).

The downlink control information generating sections 306 generate downlink shared data channel control information for controlling the PDSCH using a DCI format having DL grants as the content (for example, DCI format 1A and so on). This downlink shared data channel control information is generated on a per user basis. Also, the downlink shared data channel control information includes an identification field (CIF) for identifying the serving cell where the PDSCH is allocated.

Uplink control information generating sections 311 generate uplink shared data channel control information for controlling the PUSCH using a DCI format having UL grant as the content (for example, DCI format 0/4). This uplink shared data channel control information is generated on a per user basis. Also, this uplink shared data channel control information includes an identification field (CIF) that identifies the uplink serving cell where the PUSCH is allocated.

Also, this uplink shared data channel control information includes a request field (A-CSI trigger field) to request aperiodic channel state information (A-CSI). The value in the A-CSI trigger field may be set based on whether or not to request A-CSI reporting from the user terminals 10. Furthermore, the value in the A-CSI trigger field may be set based on the combination of downlink serving cells where A-CSI should be reported from the user terminal 10.

For example, with the first method of the present invention, DCI includes, for example, the bit values shown in FIG. 7A, as CSI request information (A-CSI trigger field). Also, with the second method of the present invention, DCI includes, for example, the bit values shown in FIG. 8, as CSI request information (A-CSI trigger field). Also, with the third method of the present invention, DCI includes, for example, the bit value shown in FIG. 9, as CSI request information (A-CSI trigger field). Note that, with the third method, CSI request information is combined with the CIF.

Also, this uplink shared data channel control information may include an RA flag, allocation information to show the number of resource blocks and the positions of resource blocks determined per user terminal, a modulation scheme, a coding rate and a redundancy version, an identifier to identify between new data and retransmitted data, a PUSCH transmission power control command, a cyclic shift for demodulation reference signals (CS for DMRS), a CQI request, an A-SRSF, a PMI/RI and so on.

Also, the baseband signal processing section 204 has a downlink common channel control information generating section 307 that generates downlink common control channel control information, which is downlink control information that is common between users.

Also, the baseband signal processing section 204 has channel coding sections 308 and modulation sections 309 to support the maximum number of users to multiplex, N, in one component carrier. The channel coding sections 308 perform channel coding of control information generated in the downlink control information generating sections 306 and the downlink common channel control information generating sections 307, on a per user basis. The modulation sections 309 modulate the downlink control information after channel coding.

Also, the baseband signal processing section 204 has channel coding sections 312 that perform channel coding of uplink shared data channel control information, on a per user basis, and modulation sections 313 that modulate the uplink shared data channel control information having been subjected to channel coding, on a per user basis.

A reference signal generating section 318 multiplexes and transmits cell-specific reference signals (CRSs), which are used for various purposes such as channel estimation, symbol synchronization, CQI measurement, mobility measurement and so on, in resource blocks (RBs) by FDM/TDM. Also, the reference signal generating section 318 transmits downlink demodulation reference signals (UE-specific RSs).

The uplink/downlink control information that is modulated in the modulation sections 309 and 313 on a per user basis is multiplexed in the control channel multiplexing section 314, and, furthermore, interleaved in the interleaving section 315. The control signal that is output from the interleaving section 315 and the user data that is output from the mapping section 305 are input in an IFFT section 316 as downlink channel signals. Also, the downlink reference signals are input in the IFFT section 316. The IFFT section 316 performs an inverse fast Fourier transform of the downlink channel signals and the downlink reference signals and converts the frequency domain signals into time sequence signals. A cyclic prefix inserting section 317 inserts cyclic prefixes in the time sequence signals of the downlink channel signals. Note that a cyclic prefix functions as a guard interval for absorbing the differences in multipath propagation delay. Transmission data, to which cyclic prefixes have been added, is transmitted to the transmitting/receiving sections 203.

Figure 19:
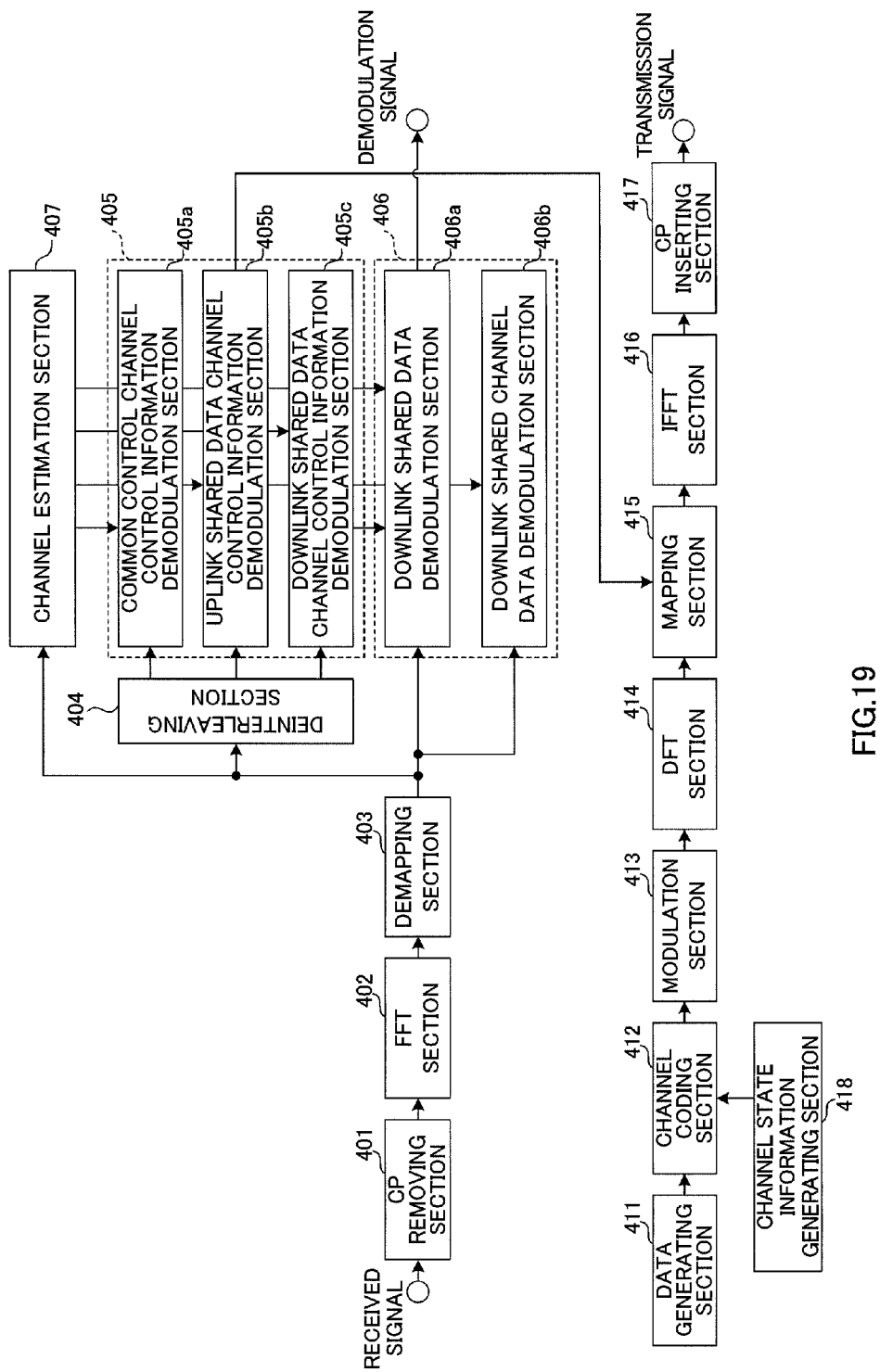
FIG. 19 is a functional block diagram of a baseband processing section provided in a user terminal according to an embodiment of the present invention.

FIG. 19 is a functional block diagram of the baseband signal processing section 104 provided in a user terminal 10, and shows the function blocks of an LTE-A terminal which supports LTE-A. Note that a user terminal 10 is configured to be able to perform radio communication using a plurality of serving cells of varying component carriers (CCs).

A downlink signal that is received as received data from the radio base station apparatus 20 has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal, and inputs this signal in a demapping section 403. The demapping section 403 demaps the downlink signal, and extracts, from the downlink signal, multiplex control information in which a plurality of pieces of control information are multiplexed, user data and higher control signals. Note that the demapping process by the demapping section 403 is performed based on higher control signals that are received as input from the application section 105. The multiplex control information that is output from the demapping section 403 is deinterleaved in a deinterleaving section 404.

Also, the baseband signal processing section 104 has a control information demodulation section 405 that demodulates uplink/downlink control information, a data demodulation section 406 that demodulates downlink shared data, and a channel estimation section 407.

The control information demodulation section 405 includes a common control channel control information demodulation section 405a that demodulates downlink common control channel control information from the downlink control channel, an uplink shared data channel control information demodulation section 405b that blind-decodes the search spaces from the downlink control channel and demodulates the uplink shared data channel control information, and a downlink shared data channel control information demodulation section 405c that blind-decodes the search spaces from the downlink control channel and demodulates the downlink shared data channel control information.

The data demodulation section 406 includes a downlink shared data demodulation section 406a that demodulates the user data and the higher control signals, and a downlink shared channel data demodulation section 406b that demodulates the downlink shared channel data.

The common channel control information demodulation section 405a extracts the common control channel control information, which is control information that is common between users, by performing a blind decoding process, a demodulation process, a channel decoding process and so on of the common search spaces of the downlink control channel (PDCCH). The common control channel control information includes downlink channel quality information (CQIs), and therefore is input in a mapping section 415 and mapped as part of transmission data for the radio base station apparatus 20.

The uplink shared data channel control information demodulation section 405b extracts user-specific uplink shared data channel control information (for example, UL grants) by performing a blind decoding process, a demodulation process, a channel decoding process and so on of the user-specific search spaces of the downlink control channel (PDCCH). The demodulated uplink shared data channel control information is input in the mapping section 415 and is used to control the uplink shared data channel (PUSCH).

The downlink shared data channel control information demodulation section 405c extracts user-specific downlink shared data channel control information (for example, DL grants) by performing a blind decoding process, a demodulation process, a channel decoding process and so on of the user-specific search spaces of the downlink control channel (PDCCH). The demodulated downlink shared data channel control information is input in the downlink shared data demodulating section 406, and is used to control the downlink shared data channel (PDSCH).

The downlink shared data demodulation section 406a acquires the user data and the higher control information based on the downlink shared data channel control information that is input from the downlink shared data channel control information demodulation section 405c. The higher control information (including CSI set information and TP set information) is output to a channel estimation section 407. The downlink shared channel data demodulation section 406b demodulates the downlink shared channel data based on the uplink shared data channel control information that is input from the uplink shared data channel control information demodulation section 405b.

The channel estimation section 407 performs channel estimation using user terminal-specific reference signals or common reference signals. The estimated channel variation is output to the common control channel control information demodulation section 405a, the uplink shared data channel control information demodulation section 405b, the downlink shared data channel control information demodulation section 405c and the downlink shared data demodulation section 406a. In these demodulation sections, demodulation processes are performed using the estimated channel variation and the demodulation reference signals.

The baseband signal processing section 104 has, as function blocks of the transmission processing system, a data generating section 411, a channel coding section 412, a modulation section 413, a DFT section 414, a mapping section 415, an IFFT section 416, a CP inserting section 417 and a channel state information generating section 418.

The data generating section 411 generates transmission data from bit data that is input from the application section 105. The channel coding section 412 applies channel coding processes such as error correction to the transmission data, and the modulation section 413 modulates the transmission data after channel coding by QPSK and so on. The DFT section 414 performs a discrete Fourier transform on the modulated transmission data. The mapping section 415 maps the frequency components of the data symbols after the DFT to subcarrier positions designated by the radio base station apparatus 20. The IFFT section 416 converts the input data, which corresponds to the system band, into time sequence data by performing an inverse fast Fourier transform, and the CP inserting section 417 inserts cyclic prefixes in the time sequence data in data units.

The channel state information generating section 418 generates channel state information (CSI (CQI/PMI/RI)) periodically or aperiodically based on the UL grants demodulated in the uplink shared data channel control information demodulation section 405b. For example, with the first method, when a user terminal UE receives bit information in DCI, the user terminal calculates CSI in accordance with the CSI set information reported from the radio base station apparatus eNB through RRC signaling (or MAC signaling, broadcast signals and so on) and the information defined in the table shown in FIG. 7A, and feeds back this CSI in the PUSCH signal. Also, with the second method, when a user terminal UE receives bit information in DCI, the user terminal UE calculates CSI in accordance with the information defined in the table shown in FIG. 8, and feeds back this CSI in the PUSCH signal. Also, with the third method, when a user terminal UE receives bit information in DCI, the user terminal calculates CSI in accordance with the TP set information reported from the radio base station apparatus eNB through RRC signaling (or MAC signaling, broadcast signals and so on) and the information defined in the table shown in FIG. 9, and feeds back this CSI in the PUSCH signal.

Note that the serving cell allocated to each value of the A-CSI trigger field may be reported in advance from the radio base station 20 to the user terminals 10 through higher control signals (for example, RRC signaling), or may be set in the user terminals 10 on a fixed basis.

Note that the embodiment disclosed herein is only an example in all aspects, and the present invention is by no means limited to this embodiment. The scope of the present invention is defined not only by the descriptions of the above embodiment and also is set by the claims, and covers all the modifications and alterations within the meaning and range equivalent to the claims.

The disclosure of Japanese Patent Application No. 2012-124571, filed on May 31, 2012, including the specification, drawings and abstract, is incorporated herein by reference in its entirety.

The invention claimed is:

1. A radio communication system comprising:
   a plurality of radio base station apparatuses; and
   a user terminal that is configured to be able to perform coordinated multi-point (CoMP) transmission/reception with the plurality of radio base station apparatuses, wherein
   when CoMP transmission is applied, the radio base station apparatuses each transmit CSI (Channel State Information) set information that is information of CSI sets each including at least one piece of CSI defined by a combination of a signal component and an interference component for a CoMP transmission point through higher layer signaling, and also transmit, using DCI Format 4 in downlink control information, CSI request information that indicates a CSI set in the CSI set information,
   the user terminal feeds back the CSI based on the CSI set information and the CSI request information, and
   the CSI set information is transmitted through multiple higher layer signaling.

2. The radio communication system according to claim 1, wherein the CSI request information is transmitted with information about a number of resource blocks and positions of the resource blocks determined per user terminal.

3. A radio base station apparatus in a radio communication system comprising a plurality of radio base station apparatuses and a user terminal that is configured to be able to perform coordinated multi-point (CoMP) transmission/reception with the plurality of radio base station apparatuses, comprising:
   a processor and a memory, wherein the processor:
   when CoMP transmission is applied, transmits CSI (Channel State Information) set information that is information of CSI sets each including at least one piece of CSI defined by a combination of a signal component and an interference component for a CoMP transmission point through higher layer signaling; and
   transmits, using DCI Format 4 in downlink control information, CSI request information that indicates a CSI set in the CSI set information, wherein
   the CSI set information is transmitted through multiple higher layer signaling.

4. The radio base station apparatus according to claim 3, wherein the CSI request information is transmitted with information about a number of resource blocks and positions of the resource blocks determined per user terminal.

5. A radio communication method in a radio communication system comprising a plurality of radio base station apparatuses and a user terminal that is configured to be able to perform coordinated multi-point (CoMP) transmission/reception with the plurality of radio base station apparatuses, the radio communication method comprising:
   in one of the radio base station apparatuses, when CoMP transmission is applied, transmitting CSI (Channel State Information) set information that is information of CSI sets each including at least one piece of CSI defined by a combination of a signal component and an interference component for a CoMP transmission point through higher layer signaling, and also transmitting, using DCI Format 4 in downlink control information, CSI request information that indicates a CSI set in the CSI set information; and
   in the user terminal, feeding back the CSI based on the CSI set information and the CSI request information, wherein
   the CSI set information is transmitted through multiple higher layer signaling.

6. The radio communication method according to claim 5, wherein the CSI request information is transmitted with information about a number of resource blocks and positions of the resource blocks determined per user terminal.

\* \* \* \* \*